UNITED STATES PATENT OFFICE.

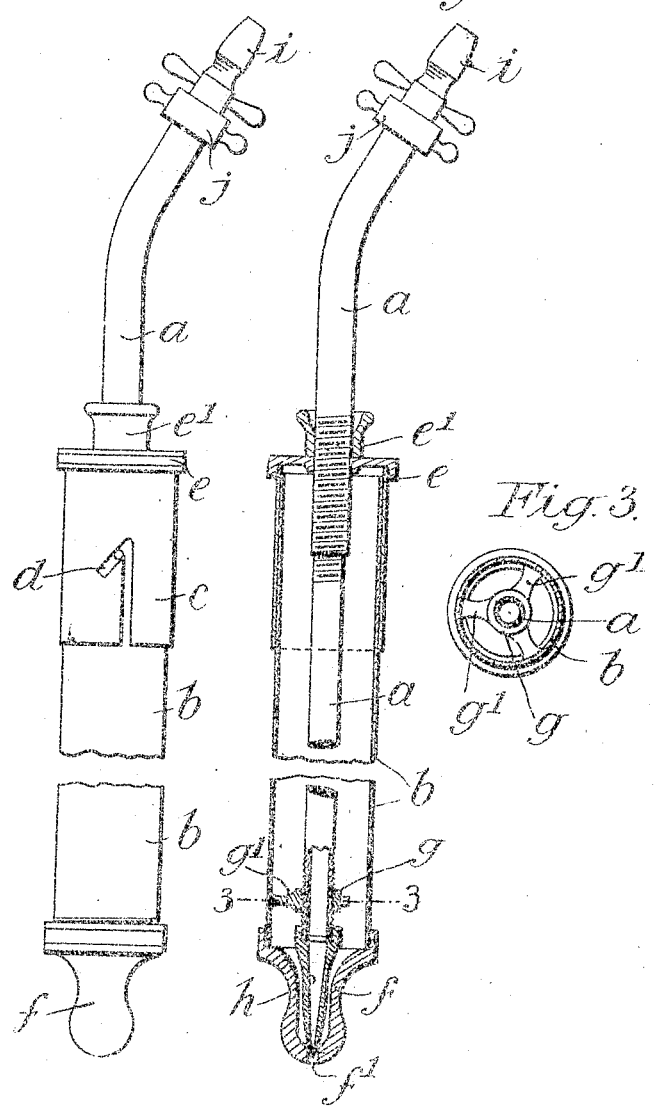

HERBERT CHARLES RICH, OF HOXTON, LONDON, ENGLAND.

SPRAYING APPARATUS.

1,112,384.

Specification of Letters Patent.

Patented Sept. 29, 1914.

Application filed July 2, 1914. Serial No. 848,635.

*To all whom it may concern:*

Be it known that I, HERBERT CHARLES RICH, subject of the King of Great Britain, residing at 187 New North road, Hoxton, London, England, have invented certain new and useful Improvements in and Relating to Spraying Apparatus, of which the following is a specification.

This invention for improvements in and relating to spraying apparatus has for its object to provide an efficient spray for paint and other solutions and consists substantially of a cylindrical reservoir or container having an opening at one end and a nozzle arranged therein and an air tube adapted to supply air under pressure to the nozzle which is carried on said air tube. The air tube which passes axially through the reservoir is adjustably connected thereto in such a manner that the nozzle can be caused to advance toward or to recede from the opening at the end of the reservoir in order to vary the amount of solution sprayed.

In one way of carrying out this invention the spraying apparatus comprises two tubes having a sliding connection and adapted to be secured by a bayonet catch, thus forming a reservoir, and a centrally arranged air tube which is screwed through the rear end of the reservoir. The forward end of the reservoir is formed with an opening into which projects the nozzle provided on the end of the air tube. The air tube is supported centrally within the reservoir by a suitable guide collar and by the screw connection between said air tube and reservoir. The air nozzle can be moved toward or away from the opening in the end of the reservoir as desired.

The air tube extends rearwardly beyond the end of the reservoir and is preferably provided with a union connection for a flexible air pipe. A valve may be provided in the air tube outside the reservoir for the purpose of regulating the air supply.

In the accompanying sheet of drawings: Figure 1 is an elevation of the spraying apparatus. Fig. 2 a longitudinal section of the same and Fig. 3 is a transverse section through 3—3 in Fig. 2.

As seen in Figs. 1 and 2 the spraying apparatus comprises an air tube $a$ which is surrounded by a liquid reservoir. The reservoir consists of two tubes $b$ and $c$ one of which, $b$, fits within the other, $c$, and is secured thereto by a bayonet fastening $d$. The end of the tube $c$ is closed by a cap $e$ which is screwed on the air tube $a$, being fixed by a lock nut $e'$, while the end of the tube $b$ has a nozzle $f$ with a central opening $f'$, the nozzle $f$ serving also as a cap. The air tube $a$ is supported centrally within the reservoir by a collar $g$ having three arms which bear against the inner surface of the tube $b$ while at its end a pointed nozzle $h$ is provided which projects into the central opening $f'$ of the nozzle or cap $f$. The position of the nozzle $h$ within the opening $f'$ can be adjusted as desired in order to vary the amount of liquid to be sprayed by rotating the reservoir around the air tube $a$. At its rear end the air tube $a$ is provided with a connection $i$ for a flexible pipe which is attached to the air tube by a union $j$. In order to open the reservoir it is screwed forward on the air tube and the part $b$ is then rotated on the part $c$ and withdrawn. When charged and reassembled the air tube is screwed forward into the reservoir until a suitable space is left between the nozzle $h$ and the opening in the cap $f$. The tube $a$ is now connected to a compressed air supply pipe suitably controlled by a valve (not shown), and the spraying apparatus is now ready for use.

The apparatus when in use is turned downward and the rush of air through the nozzle $h$ causes the solution to spray out of the cap $f$ by the suction produced.

Having thus described my invention, what I claim and desire to secure by Letters Patent is:—

A spraying apparatus comprising in combination, two telescopic cylindrical sections adapted to form a liquid reservoir, a bayonet slot connection between said telescopic sections, a closure for one end of said reservoir having a threaded aperture therethrough, and a nozzle closure for the other end of said reservoir, an air tube entering the threaded aperture in said first mentioned closure, a nozzle disposed on the end of said air tube and having its opening concentric and lying within the opening of said nozzle closure, said threaded aperture providing means whereby the relative distance between said nozzle closure and said air nozzle may be varied to vary the quantity of liquid sprayed, and a guide to said air tube disposed within said reservoir.

In testimony whereof I affix my signature, in presence of two witnesses.

HERBERT CHARLES RICH.

Witnesses:
 DORA JESSIE SQUIRE,
 S. NASH.